(12) United States Patent
Hansen

(10) Patent No.: US 11,340,015 B2
(45) Date of Patent: May 24, 2022

(54) DATA COLLECTOR FOR USE IN MONITORING A LYOPHILISATION PROCESS OF A PRODUCT IN A TEST PRODUCT CONTAINER IN A LYOPHILISATION CHAMBER, CORRESPONDING SYSTEM COMPRISING THE DATA COLLECTOR, AND USE OF DATA COLLECTOR

(71) Applicant: Ellab A/S, Hillerød (DK)

(72) Inventor: Rasmus Hansen, Hillerød (DK)

(73) Assignee: Ellab A/S, Hillerød (DK)

( * ) Notice: Subject to any disclaimer, the term of this patent is extended or adjusted under 35 U.S.C. 154(b) by 36 days.

(21) Appl. No.: 16/878,898

(22) Filed: May 20, 2020

(65) Prior Publication Data

US 2020/0370828 A1 Nov. 26, 2020

(30) Foreign Application Priority Data

May 21, 2019 (EP) .................................... 19175663

(51) Int. Cl.
*F26B 5/06* (2006.01)
*F26B 9/00* (2006.01)
(Continued)

(52) U.S. Cl.
CPC ................ *F26B 5/06* (2013.01); *F26B 9/003* (2013.01); *F26B 9/066* (2013.01); *F26B 21/10* (2013.01); *G06K 7/10089* (2013.01)

(58) Field of Classification Search
CPC .. F26B 5/06; F26B 9/003; F26B 9/066; F26B 21/10; G06K 7/10089
(Continued)

(56) References Cited

U.S. PATENT DOCUMENTS 3,648,379 A * 3/1972 Mercer ..................... A23F 5/32
34/284
4,823,478 A * 4/1989 Thompson, Sr. ......... F26B 5/06
34/287
(Continued)

FOREIGN PATENT DOCUMENTS

EP 3250868 B1 * 7/2020 ......... G05D 23/1917
EP 3742095 A1 * 11/2020 .............. F26B 9/003
(Continued)

OTHER PUBLICATIONS

Extended European Search Report received in corresponding EP application No. 19175663.4 dated Nov. 7, 2019.

*Primary Examiner* — Stephen M Gravini
(74) *Attorney, Agent, or Firm* — Avek IP, LLC

(57) ABSTRACT

A data collector for use in monitoring a lyophilisation process of a product in a test product container in a lyophilisation chamber, said data collector comprising a battery, a measuring device including an electronics unit and a sensor configured for being arranged in said test product container, a first compartment in a first portion, a second compartment in a second portion, a first end surface configured for resting on the support surface, and a second end surface opposite to the first end surface, wherein said first and second portions are arranged side-by-side when seen in a plane defined by the first end surface, and wherein the battery is housed in the first compartment and the electronics unit of the measuring device is housed in the second compartment, such that the battery and the electronics unit are separate from each other.

20 Claims, 6 Drawing Sheets

(51) Int. Cl.
    *F26B 9/06*         (2006.01)
    *F26B 21/10*       (2006.01)
    *G06K 7/10*        (2006.01)

(58) Field of Classification Search
    USPC .......................................................... 34/284
    See application file for complete search history.

(56) References Cited

U.S. PATENT DOCUMENTS

| | | | |
|---|---|---|---|
| 7,713,421 B2 * | 5/2010 | Galbraith | B01D 53/0446 210/663 |
| 8,726,534 B2 * | 5/2014 | Chappell | F26B 9/003 34/202 |
| 9,709,327 B2 * | 7/2017 | Marchiori | F26B 5/12 |
| 2006/0239331 A1 | 10/2006 | Schwegman | |
| 2009/0175315 A1 | 7/2009 | Schwegman | |
| 2020/0201369 A1 * | 6/2020 | Brower | G05D 23/1932 |
| 2020/0370828 A1 * | 11/2020 | Hansen | F26B 9/003 |
| 2021/0190424 A1 * | 6/2021 | De Beer | F26B 25/18 |

FOREIGN PATENT DOCUMENTS

| | | | | | |
|---|---|---|---|---|---|
| FR | | 1286002 A | * | 3/1962 | ............. G05D 23/20 |
| JP | | 6718879 B2 | * | 7/2020 | ....... G06Q 10/06395 |
| WO | | 2006092885 A1 | | 9/2006 | |
| WO | WO-2016123062 A1 | | * | 8/2016 | ............. G01K 1/024 |
| WO | WO-2020002605 A1 | | * | 1/2020 | ................ F26B 5/06 |

\* cited by examiner

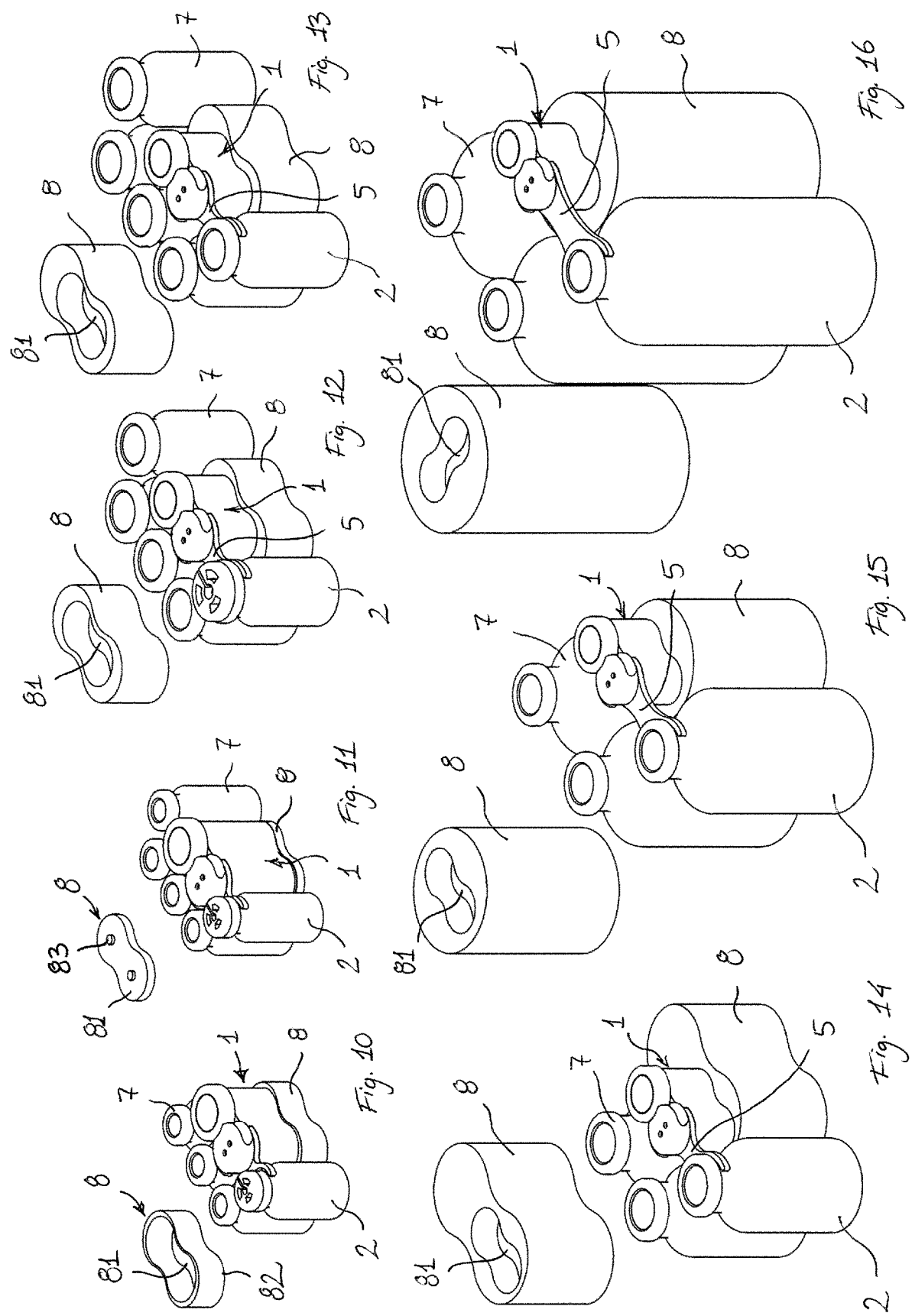

DATA COLLECTOR FOR USE IN MONITORING A LYOPHILISATION PROCESS OF A PRODUCT IN A TEST PRODUCT CONTAINER IN A LYOPHILISATION CHAMBER, CORRESPONDING SYSTEM COMPRISING THE DATA COLLECTOR, AND USE OF DATA COLLECTOR

CROSS-REFERENCE TO RELATED APPLICATIONS

This application claims the benefit of priority of E.P. Patent Application No. 19175663.4, filed May 21, 2019, the entire disclosure of which is incorporated by reference herein in its entirety.

SUMMARY

The invention relates to a data collector for use in monitoring a lyophilisation process of a product in a test product container in a lyophilisation chamber, where a plurality of product containers of substantially the same size and shape are arranged side-by-side on a support surface of the lyophilisation chamber. The invention further relates to the use of such a data collector.

According to one embodiment, a data collector is provided for use in monitoring a lyophilisation process of a product in a test product container in a lyophilisation chamber, where a plurality of product containers of substantially the same size and shape are arranged side-by-side on a support surface of the lyophilisation chamber. The data collector includes a first end surface configured for resting on the support surface; a second end surface opposite to the first end surface; a first compartment in a first portion; a second compartment in a second portion; a battery; and a measuring device including an electronics unit and a sensor configured for being arranged in said test product container. The first and second portions are arranged side-by-side when seen in a plane defined by the first end surface. The battery is housed in the first compartment and the electronics unit of the measuring device is housed in the second compartment, such that the battery and the electronics unit are separate from each other.

According to another embodiment, a system includes at least one data collector as described above. The system further comprises a data processing unit arranged outside of the lyophilisation chamber, said data processing unit being in communication with the data collector when in use in the lyophilisation chamber.

According to still another embodiment, a system includes at least one data collector as described above. The system further comprises at least one adaptor module for receiving the data collector, such that the first end surface rests on a receiving surface of the adaptor module, said adaptor module having a resting surface configured for resting on the support surface.

BRIEF DESCRIPTION OF THE DRAWINGS

FIGS. 10-16 are perspective views of the data collector in FIG. 6 in combination with seven different adaptor modules and with connector elements as show in FIG. 7.

DETAILED DESCRIPTION

Figure 1:
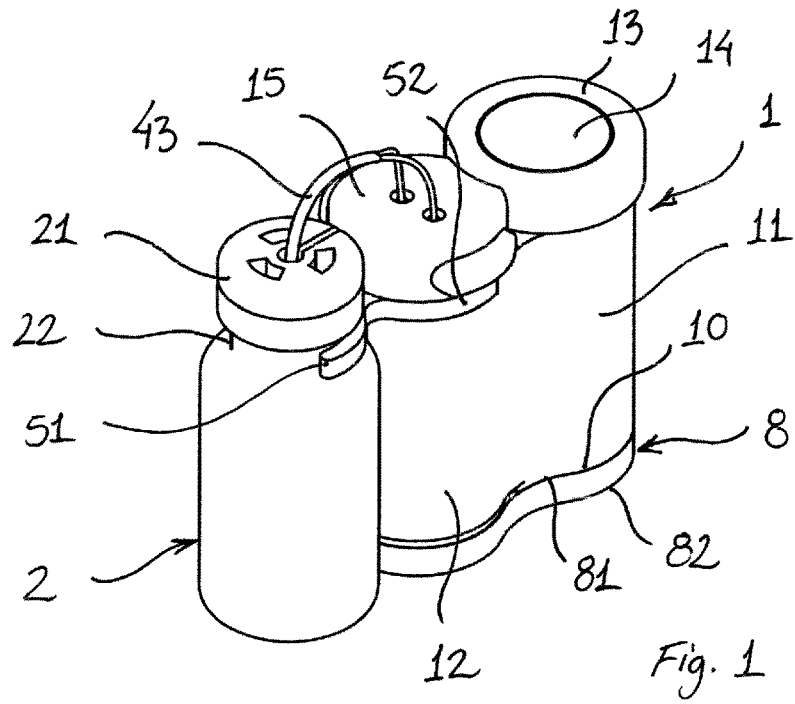
FIG. 1 is a perspective view of a data collector and a test product container.

Data collectors are used for documenting lyophilisation processes and checking lyophilisation chambers, for example in the production of pharmaceutical products, where it is of particular importance that the lyophilisation process is controlled precisely. The product containers are then typically upwards open vials having a circular cross sectional shape in the plane extending in parallel to the support surface, said vials being made from glass or a polymer and being arranged closely together in an array on the support surface. Each vial is provided with a cap at the opening. During the lyophilisation process the cap is only partially inserted in the vial opening and openings in the cap allow vapour to escape from the vial. When the lyophilisation process is complete the cap is pressed into the vial, thereby sealing both the cap openings and the vial opening so that the dried product in the vial is isolated from the environment. The caps of all vials on a support surface are usually pressed down simultaneously by means of a plate shaped member, which may be another superjacent support surface.

It is well known in the art that data collectors may influence the lyophilisation process due to the presence of the data collector within the lyophilisation chamber and the array of product containers. In order to minimize the effect of the presence of the data collector, it has been attempted to make it replace the cap on the vial, an example being disclosed in EP3250868A1. This solution, however, requires the vials to be relatively big in order to support the data collector.

Another way of reducing the effect of the presence of the data collector is to reduce the functionality within the data collector to a minimum and transmit data via cable connections extending through the walls of lyophilisation chambers to an electronics unit outside the lyophilisation chamber. Such cable connections, however, may conduct thermal energy and may therefore also affect the lyophilisation process.

It is therefore one object of the invention to provide a data collector which has a minimal impact on the lyophilisation process while at the same time being usable even when the product containers are very small vials.

A further object of the invention is to provide a data collector that can be loaded automatically with the vials in the lyophilisation chamber without the need for a manual insertion of the data collector. These objects may be achieved with a data collector further comprising a battery, a measuring device including an electronics unit and a sensor configured for being arranged in said test product container, a first compartment in a first portion, a second compartment in a second portion, a first end surface configured for resting on the support surface, and a second end surface opposite to the first end surface, wherein said first and second portions are arranged side-by-side when seen in a plane defined by the first end surface, and wherein the battery is housed in the first compartment and the electronics unit of the measuring device is housed in the second compartment, such that the battery and the electronics unit are separate from each other.

Arranging the battery and the electronics unit in separate compartments arranged side-by-side means that each compartment, and hence the first and second portions, can be kept relatively small. This allows the data collector to be arranged in an array of product containers so that each portion takes up substantially the same space as one product container, thus impacting minimally on the array of product containers and the capacity of the lyophilisation chamber.

In order to ensure that the lyophilisation process proceeds in the same way in the test product container as in the regular product containers, the test product container may normally be identical to the regular product containers except for being provided with a cap, which allows the insertion of a sensor into the product contained therein.

In embodiments, the first and second portions each have a cross section parallel to the first end surface, which is substantially circular, such that the corresponding cross section of the data collector is substantially the shape of the figure eight. This makes the data collector well suited for use where the product containers are vials having a substantially circular cross section of substantially the same diameter as the cross-section of the first and second portions, as the data collector will then fit in an array of vials arranged closely side-by-side. The area of the support surface occupied by the data collector will then correspond substantially to the area occupied by two product containers arranged side-by-side, and the rounded shape means that product containers arranged adjacent to the data collector will not be prevented from rotating about a vertical axis as often happens during automated insertion on a support surface.

This means that the presence of the data collector only has a minimal impact on the production capacity. Moreover, the data collector and a test product container attached thereto can be arranged among the regular product vials and pushed along by these as they are being inserted onto the support surface, substantially without impacting on the chamber filing process. Thus a stop of an automatic loading process of the vials into a lyophilisation chamber to position a data collector correctly in the chamber may be avoided.

To allow the data collector to also fit into an array of product containers when seen in the height direction, the data collector has a height measured from the first end surface to the second end surface, which corresponds substantially to the height of the smallest available product container, and the largest exterior diameter of first and second portion, respectively, corresponds substantially to the largest diameter of the smallest available product container. This ensures that even when using very small vials the caps of the product containers on the support surface can be pressed down simultaneously by means of a plate shaped members without having to remove the data collector, and that one data collector can be used with all available product container sizes as will be described in further detail below. The data collector may in some situations have a height that is smaller than the height of the product container, e.g. in order to allow it to be used even if the product containers are equipped with caps that are thinner or smaller in height than usual, such that the height of the data collector still has substantially the same height as the product container equipped with such caps. A further advantage of having a data collector that is smaller than the product container is that the wires connecting the sensor to the electronics unit may be protected, when the plate shape member presses down the caps of the product containers.

In some embodiments, the distance between first and second end surface is less or equal to 30 mm.

By the wording "smallest available product container" is meant the smallest size, which is commercially available as a standard product. It is, however, also possible to make a data collector, which is specially designed for use both with a small non-standard product container and with bigger product containers.

In embodiments, the first portion is configured to be distal to the test product container and the second portion is configured to be proximal to the test product container when the data collector is in use. This means that the battery, which is having a higher thermal capacitance than the electronics unit of the measuring device, is located furthest away from the test product container, thereby minimizing the influence on the measurement data collected by the data collector.

The indicating parameter usually providing the most reliable correlation with the lyophilisation process is the temperature of the product just above the bottom of the product container. It is therefore presently preferred that the measuring device comprises a temperature measuring device, but other measuring devices adapted for measuring for example pressure, conductivity, or resistivity may also be employed and more than one parameter may be measured.

In one embodiment the temperature measuring device comprises a thermocouple sensor, which allows for a wide temperature measurement range compared to other type of temperature sensors, such as resistance temperature detector (RTD) sensors or thermistors. Under a lyophilisation process, very low temperatures may be reached, such as temperatures down to −100° C. and up to 50° C. A further advantage of using a thermocouple to measure the temperature, is that a more localised temperature sensing is achieved, by measuring at a single point instead of measuring over the length of the sensor element, as in RTDs. This may especially be the case when measuring in small product containers, where it may be preferable to measure near the bottom of the product container rather than over the mean volume of test product contained in the product container in order to get a better indication of the state of the lyophilisation process as this point may be the most relevant point of the product to measure. Thermocouple sensors offer a good trade-off between accuracy, price, and temperature range for the application of temperature sensing in lyophilisation processes. Thermocouple sensors, however, generally occupy more space than other type of temperature sensors, as more electronic components are needed such as a ADC & PT1000 circuit for cold-junction compensation. With the provision of a separate chamber for the electronics unit it is possible to allow the use of a thermocouple while at the same time making the data collector sufficiently small to be used even with the smallest commercialised standard sized product container.

In order to allow maintenance at least one of the first compartment and the second compartment may be configured to be opened at the first end surface and/or the second end surface. At present it is considered expedient to allow users to open only the first compartment in order to be able to replace the battery.

If making the first compartment openable, it can advantageously be provided with a lid comprising a sealing portion. The sealing portion will reduce the risk of moisture entering the first compartment, where it might potentially harm the battery.

In order to provide a connection between the first and second compartments, which will allow a cable to extend between the battery and the electronics unit, a channel may extend through an intermediate portion between the first and the second compartment. It is, however, also possible to make a cable extend upwards through the second end-surface so that the first and second compartments are not directly interconnected.

In embodiments, the data collector further comprises a connector for holding a test product container when the data collector is in use, said connector preferably being attached at the second portion. Providing a connector for holding a test product container allows the data collector and the test product container to be interconnected, thus securing that their intended mutual positioning is maintained even when product containers are pushing on them from the sides. This in turn means that the risk of the sensor being displaced in relation to the test product container and/or the connection between the sensor and the electronics unit being damaged can be reduced.

The connector may be adapted for pressing the test product containers downwards towards the support surface so that its bottom is kept in contact with the support surface.

The connector may be an integrated part of the data collector, but in embodiments, the connector may be a separate part. This has the advantage the connector can easily be replaced if broken or if wanting to use the data collector with a different type of test product container.

The second portion may comprise at least one connection terminal for connecting the sensor to the electronics unit. This may allow easy replacement of the sensor and/or reduce the risk of damages to the electronics unit or wiring connecting the sensor to the electronics unit in case the sensor is being pulled on or otherwise mishandled.

In some embodiments, the electronics unit comprises at least one element chosen from the group comprising: a wireless transmitter/receiver unit (WTRU), a data storage unit, a hall sensor, and a control unit.

By including a WTRU, data may be continuously transmitted to a data processing unit arranged outside of the lyophilisation chamber, thus providing real-time measurements from the lyophilisation process. This may also be defined or considered as active data transmission and may be performed in an automatic way. This may allow detection of temperature variations while the lyophilisation process is performed and may give the opportunity to an operator to react to a possible failure immediately. Alternatively, the measured data may be stored on the data storage unit and may be transferred to a data processing unit, for example, when the data collector is taken out of the chamber and placed in a data reader station, or when the WTRU is asked by the data processing unit to transmit the data. This may be defined or considered as passive data transmission, which may be either semi-automatic or manual i.e. partially or completely performed by an operator. It may be advantageous to limit the transmission rate e.g. the rate of sending and receiving data points and/or the sample rate of the data collector in order to preserve the memory capacity and longevity of the battery.

The walls of the first portion and the second portion may be understood as the housing of the data collector. When having a WTRU in the data collector it may be preferable that the material used for the housing lets electromagnetic waves through such that the WTRU may be able to receive and transmit through the housing. Such a material may e.g. be polyether ether ketone (PEEK) or polyphenylene sulphide (PPS) or polytetrafluoroethylene (PTFE) or polyimide (PI).

By including a data storage unit, data collected from the sensor may be stored locally in the data collector and transmitted to a data processing unit after the termination of the lyophilisation process. This may be used as an alternative to the continuous transmission described above, or as a supplement. As lyophilisation chambers are usually massive structures including a considerable amount of metal, signals to/from data collector and other measuring devices inside the chamber are sometimes interrupted, which has been known to result in loss of data in prior and current available systems. By including a data storage unit in the data collector, data lost in a real-time monitoring of a lyophilisation process can be retrieved afterwards. This may for example be advantageous when the data are used for validation and documentation purposes. The data stored on the data collector may thereby by synchronized with the data processing unit outside the chamber when the data collector is taken out of the chamber or even during the lyophilisation process when the signal has been re-established. Thereby an operator is not needed to supervise and monitor the whole process while it is performed, and the data may be analysed at a later stage.

A data collector including a data storage unit is also known as data logger. The battery may power one, some, most, or all of the elements of the data collector. This may be done directly by having wiring from the battery to each of the elements to be powered, or indirectly by having the battery connected to one or more of the elements and the remaining elements connected through the element(s) connected to the battery. The battery may substantially have the size of half an AA-battery or full size AA-battery. The battery may e.g. be a battery such as a lithium-ion, lithium iron phosphate or lithium thionyl chloride relevant for ultra-low temperatures.

Some lyophilisation processes can last for up to 50-100 hours, for example 80 hours and it may not be a necessity to make continuous measurements or measurements with a high sample rate. It may therefore be advantageous to be able to activate and deactivate some or all of the battery consuming elements of the data collector, in order to save battery for the whole process or for several lyophilisation process runs. Not necessarily all the steps of the lyophilisation process are equally relevant to measure data for, and it might therefore be possible to pre-determine an activation plan for when the data collector should be activated and deactivated. The activation plan may be pre-programmed in the control unit in the data collector or alternatively transmitted to the WTRU from a control unit outside the chamber. The activation and deactivation may also in some cases be performed manually from outside the chamber.

By including a hall sensor, the data collector may be activated and deactivated at a required point in time. "Deactivated" may be understood to mean that the data collector is in a state where it is partly or completely turned off i.e. not measuring or logging any data and substantially not consuming battery power, but still able to receive or generate a signal to be activated, and brought into a state where it is turned on and start e.g. measuring temperature, transmitting data and/or saving data to the data storage unit. The data collector may be activated by a signal generated by an element comprised in the data collector itself, e.g. a control unit, or by a signal generated by an external source, e.g. a control unit located outside the chamber. The hall sensor may thereby be used as a transducer for activating the data collector.

A control unit may be operatively connected to the different elements in the data collector or any other element according to the invention. The control unit may be wirelessly connected to the different elements of the data collector and to the data processing unit outside the lyophilisation chamber. Furthermore, the control unit may be connected to an external network, where the network may e.g. be a network within or outside the chamber or a global network such as the internet. The control unit may be configured to have access to pre-stored and/or pre-programmed software and algorithms to obtain data and perform e.g. a measuring plan stored on a database e.g. linked to the data processing unit or an alternative database. The database may be mirrored on an external data storage, for example in case of a failure to save or collect data. As discussed above the control unit may receive an input e.g. from an operator to activate or deactivate the data collector. This may for example be done remotely from the lyophilisation chamber from an operator's interface.

More than one data collector may be used for monitoring the same lyophilisation process. This may for example be relevant where the lyophilisation chamber comprises several support surfaces, in which case data collectors may be arranged on different support surfaces, such as different positions on the same shelf and/or on different shelves in the lyophilisation chamber.

Another object of the invention is to provide a system including a data collector, which can be used with all sizes of product containers. This may be achieved with a system comprising at least one data collector of the type describe above, wherein the system further comprises at least one adaptor module for receiving the data collector, such that the first end surface rests on a receiving surface of the adaptor module, said adaptor module having a resting surface configured for resting on the support surface.

By arranging the data collector on an adaptor module having outer dimension when seen in a plane defined by the resting surface corresponding to the dimension of a standard size product container or a plurality of standard size product containers arranged closely side-by-side, the adaptor module will fit in an array of product containers in the same way as described above with reference to the data collector. This means that a data collector of a relatively small size can be arranged on an adaptor module matching the size of larger product containers and that the assembly consisting of the data collector and the adaptor module will then fit into the array of product containers, for example taking up the space otherwise occupied by two product containers.

The distance between the receiving surface and the resting surface preferably corresponds substantially to the difference between the height of the product containers and the height of the data collector.

In use when monitoring a lyophilisation process of a product in a test product container in a lyophilisation chamber, a plurality of product containers of substantially the same size and shape are arranged side-by-side on a support surface of the lyophilisation chamber, where an adaptor module is chosen corresponding to the size and shape of the product containers such that the total area and height of the adaptor module with the data collector received thereon corresponds substantially to the area and height of two product containers arranged side-by-side. If the product containers are very large compared to the data collector, the adaptor module may be of circular cross-section and take up only the space of one product container.

The system may include several different adaptor modules so that one data collector may be used with several different types of product containers having different dimensions.

As described with above reference to the data collector, the adaptor module too may have an eight-shape and the system may include adaptor modules of different shapes, for example both eight-shaped and with a circular cross-sectional shape when seen in a plane defined by the resting surface.

The adaptor module(s) is/are preferably made from a material with a low thermal capacitance so that it has the lowest possible impact on the lyophilisation process. Examples of such materials are PEEK, PPS, PTFE or PI.

The data collector according to the invention and the system described above may for example be used for monitoring a lyophilisation process where the product containers are vials, preferably in the range 2 R to 100 R as defined in ISO standard 8362. The adaptor modules may, however, also be adapted for use with other product container types, such as vials having other dimensions.

Likewise, the adaptor modules may also be used with other types of data collectors not having a first and a second compartment arranged side-by-side.

Figure 2:
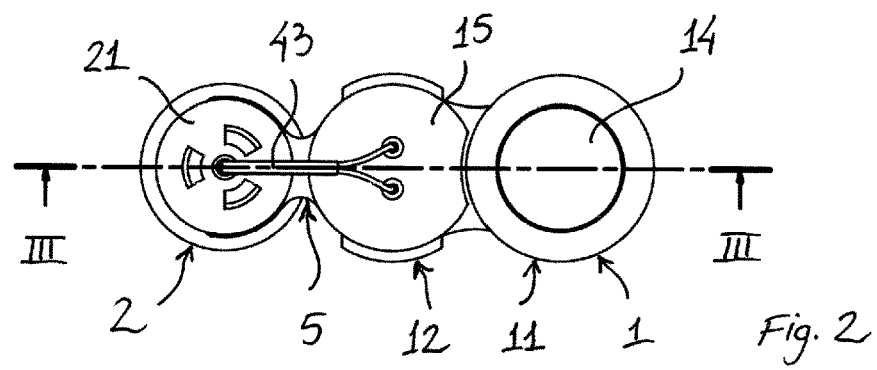
FIG. 2 is a top view of a data collector and a test product container in FIG. 1.
Figure 3:
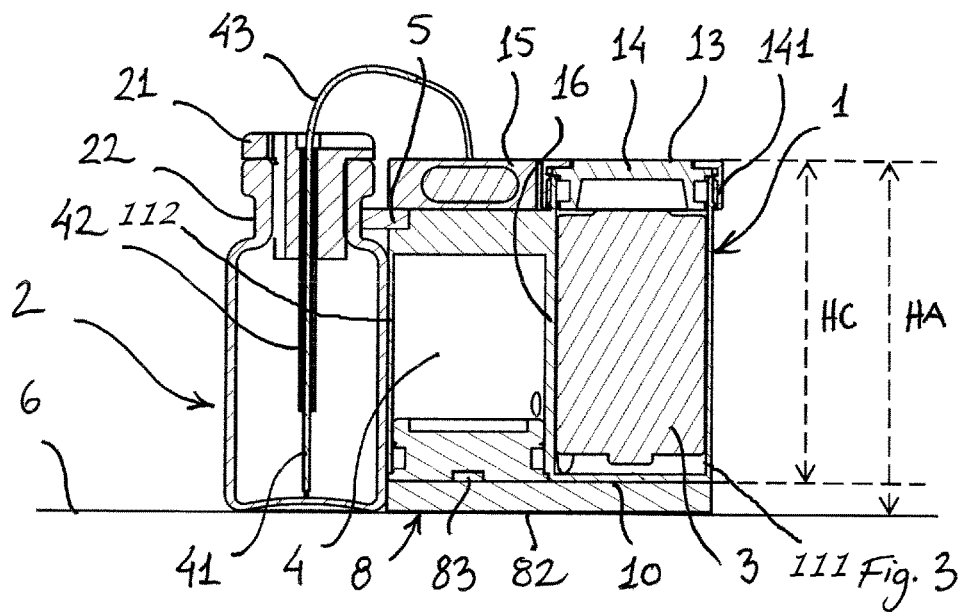
FIG. 3 is a cross-sectional view along the line in FIG. 2.
Figure 4:
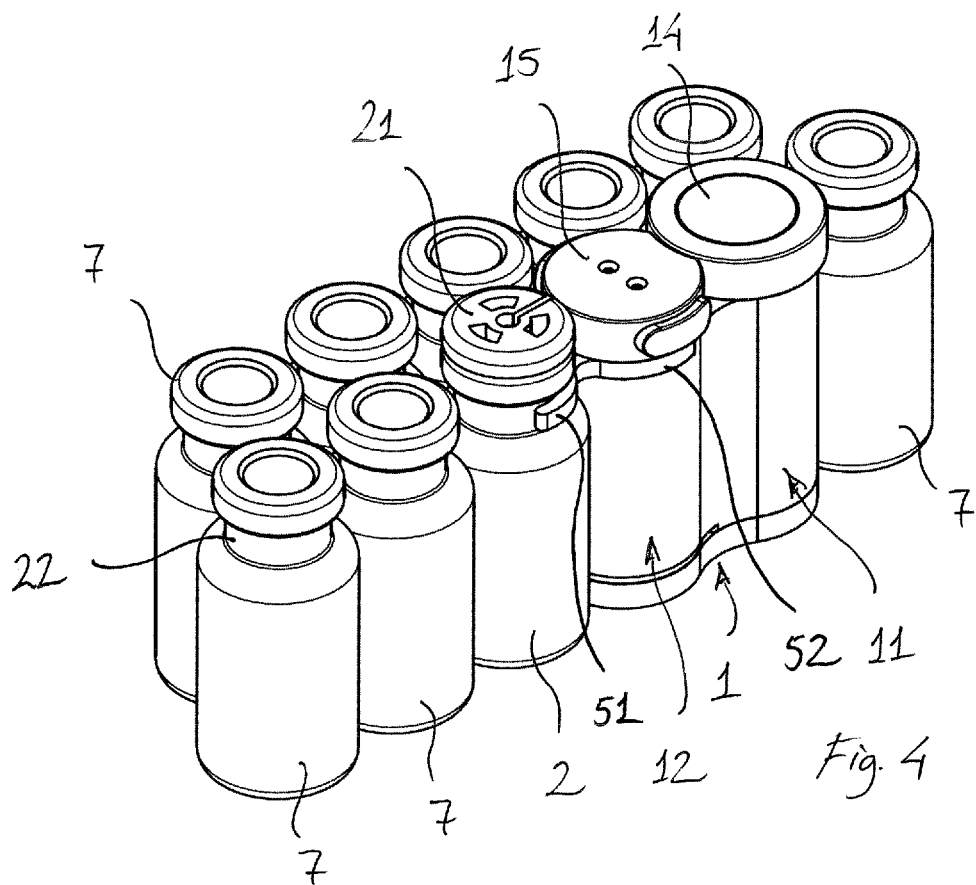
FIG. 4 is a perspective view of the data collector and test product container in FIGS. 1-3 arranged in an array of product containers.
Figure 5:
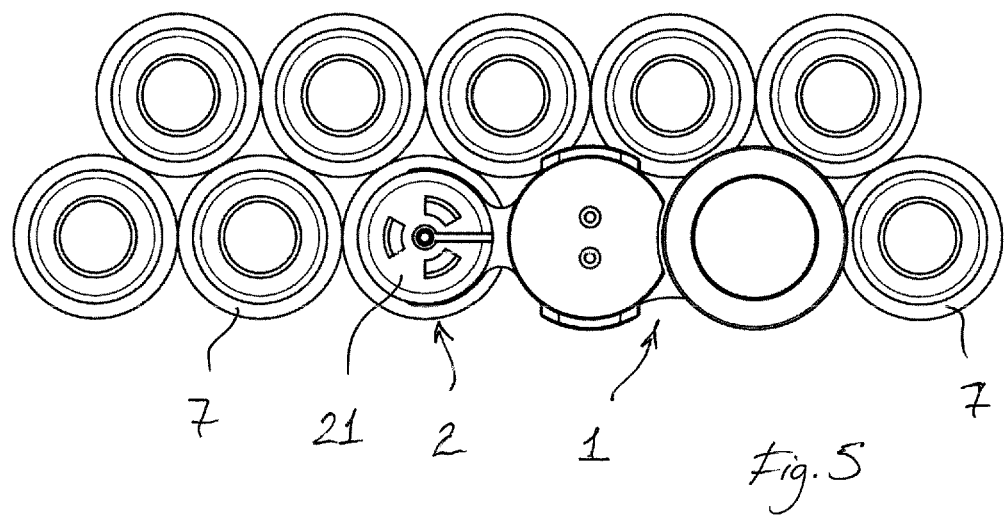
FIG. 5 is a top view of the array in in FIG. 4.

Referring now to the drawings, and specifically FIGS. 1-3, a data collector 1 for use in monitoring a lyophilisation process is shown connected to a test product container 2. In FIGS. 4-5 a data collector 1 is shown being arranged in an array of regular product containers 7.

The data collector comprises a first portion 11 and a second portion 12, which are arranged side-by-side when seen in a plane defined by the bottom surface 10. The bottom surface 10, which is also called the first end surface, is configured for resting either directly on a support surface 6 in a lyophilisation chamber or on an adaptor module 8 as will be described in further detail below.

The second end surface 13 opposite to the first end surface 10 is here defined by a lid 14 covering a first compartment 111 in the first portion 11 as is best seen in FIG. 3 and a connection terminal 15 covering a second compartment 112 in the second portion 12. In this embodiment the lid 14, which comprises a sealing portion in the form of a gasket 141, allows the first compartment 111 to be opened at the second end surface 13 so that the battery 3 housed in the first compartment may be replaced, while the connection terminal 15 is not intended to be removed by a user of the data collector. In other embodiments it will also be possible to open the second compartment 12, either by removal of the connection terminal or by providing a lid (not shown) at the first end surface 10. Likewise, a lid (not shown) providing access to the first compartment at the first end surface may be provided.

While the first compartment 111 houses a battery 3, the second compartment houses an electronics unit 4, which is connected to a sensor 41 via the connection terminal 15 and wires 43, said electronics unit 4 and sensor 41 together forming a measuring device. Power is supplied from the battery to the electronics unit either via conductors (not shown) integrated in the walls of the data collector or via wiring (not shown) extending through a channel extending through the intermediate portion 16, which separates the first and second compartments 111,112. In this way the battery and the electronics unit are kept separate from each other, which means that the battery may be replaced with a very low risk of damaging the electronics unit. In the embodiment shown in FIG. 3 the battery 3 is ½ AA sized battery.

The electronics unit 4 is responsible for receiving data from the sensor 41 arranged in the test product container 2 and for making these data available for use in a data processing unit. For this purpose, the electronics unit may for example include a wireless transmit receiver unit (WTRU), a data storage unit, a hall sensor, and a control unit. Such components have been described above and are known to the skilled person and will therefore not be described in further detail here.

The test product container 2 is provided with a cap 21 comprising a guiding tube 42 for guiding the sensor 41 into the test product container 2. The guiding tube 24 may also contribute to keeping the sensor 41 in the intended position in relation to the walls and bottom of the test product container 2.

It is noted that the regular product containers 7 are shown without caps in the figures, but that caps will be provided during a lyophilisation process.

In the embodiments shown, the first and second portions 11, 12 each have a cross section parallel to the first end surface 10, which is substantially circular, such that the corresponding cross section of the data collector is substantially eight shaped. This means that when the data collector 1 is arranged on a support surface 6 in an array of product containers 7 as shown in FIGS. 4-5, the first and second portions 11, 12 each take up substantially the same space as a product container so that the array is unaffected by the presence of the data collector except for it having replaced two product containers. This not only means that the impact on the lyophilisation process is minimal but also that an array including the data collector can be moved by being pushed sideways over the support surface 6, as is common practice, without disturbing the regular product containers 7.

The data collector 1 further comprises a connector 5 for holding the test product container 2 when the data collector is in use. The connector 5 is provided on the second portion 12 so that when the data collector is in use as shown in FIGS. 4 and 5, the first portion 11 will be distal to the test product container 2. This means that the battery 3, which has a relatively high thermal capacitance compared to the electronics unit 4 and which may potentially generate heat, is kept away from the test product container.

In embodiments the connector 5 has two arms 51, which are slightly bent towards each other so that a semi-circular space is formed between them. This space is adapted for accommodating the test product container 2, in this case a neck section 22 thereof, so that the test product container is prevented from moving in relation to the data collector in at least one direction. In order to securely hold the test product container 2, the connector 5 is here made from a slightly elastic material and with a diameter of the space between the arms 51, which is slightly smaller than the outer diameter of the neck section 22 of the test product container, so that the connector can snap onto the test product container.

The connector 5 is preferably made so that it presses the test product containers 2 downwards towards the support surface 6, thereby keeping it (or an adaptor module on which it is resting) in contact with the support surface. This may for example be achieved by letting the arms 51 curve slightly downwards and/or by elasticity in the arms 51.

The connector 5 may be an integrated part of the data collector 1, or it may be a separate part. The connector 5 being separate has the advantage that the connector can easily be replaced if broken or if wanting to use the data collector with a different type of test product container 2.

Figure 6:
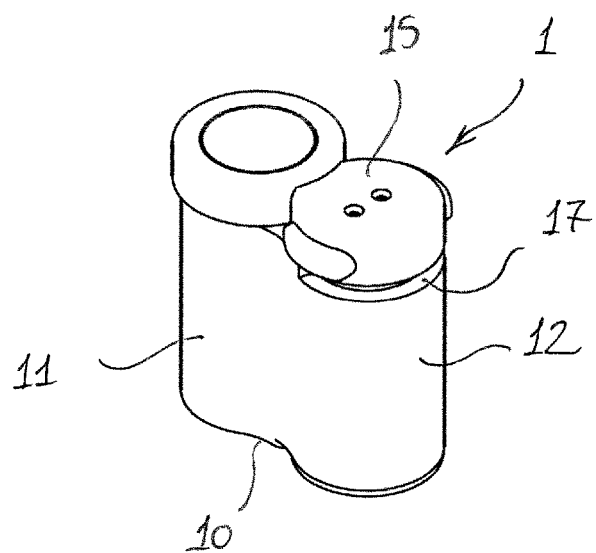
FIG. 6 is a perspective view corresponding to FIG. 1 but showing the data collector without a connector.
Figure 7:
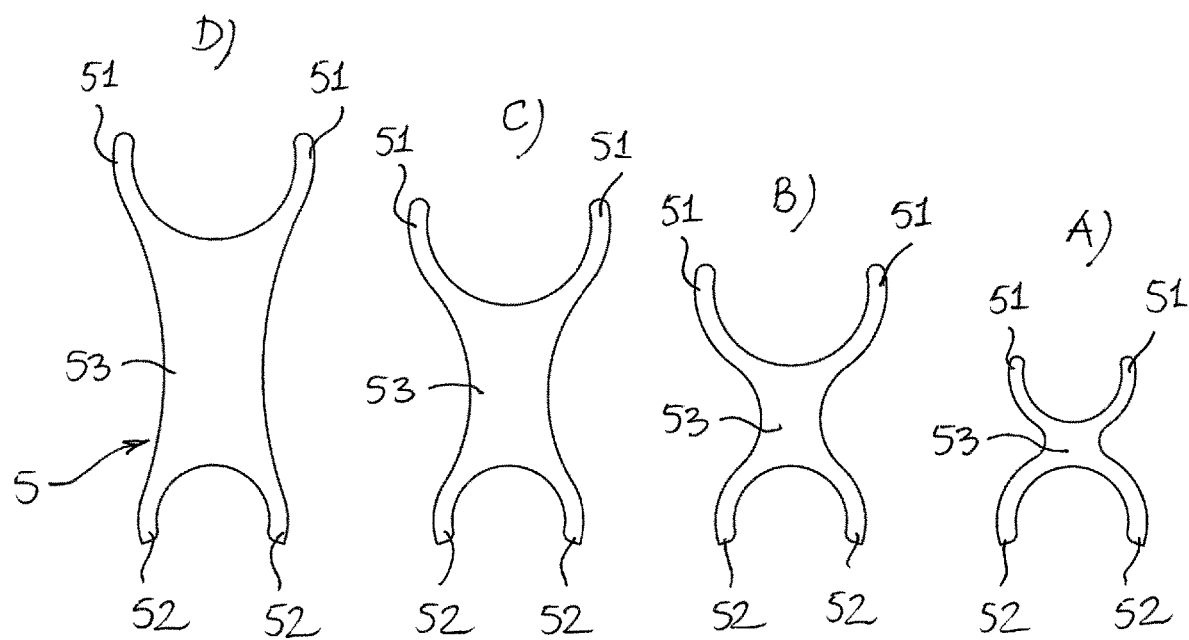
FIG. 7 is a top view of four different connectors adapted for use with the data collector in FIG. 6.

As shown in FIG. 6, the data collector 1 is provided with a groove 17 extending more than halfway around the second portion 12 immediately underneath the connection terminal 15 and substantially in parallel with the first end surface 10. This groove is adapted for engagement with a connector 5 of the type shown in FIG. 7, which has the overall shape of an X, where the arms are slightly bent so that two semi-circular spaces are formed between the arms. The pair of arms 52 pointing downwards in FIG. 7 is adapted for being inserted in the groove 17, while the pair of arms 51 pointing upwards are adapted for holding the test product container 2 as described above. Just as described with reference to the arms 51 holding the test product container 2, the arms engaging with the groove 17 may be made from a slightly elastic material and with a diameter of the space between them, which is preferably slightly smaller than the outer diameter of second portion 12 at the groove 17, so that the connector 5 can snap onto the second portion.

In some embodiments the connection with the second portion 12 and/or with the test product container 2 may be established by means of friction and/or by making the connector extend all the way around the data collector 1 and/or the test product container.

The four connectors 5 shown in FIG. 7 differ in that the arms 51 adapted for holding the test product container 2 have different lengths and curvatures and in that the centre sections 53 extending between the two sets of arms 51, 52 have different lengths. The different lengths and curvatures of the arms 51 mean that the spaces between them have different sizes and the different connectors 5 are thus adapted for use with test product containers having neck sections 22 of different sizes.

When product containers 7 of different diameter are arranged closely side-by-side in an array on a support surface 6 their mutual distance will depend on their outer diameter and the total length of the connector 5 used will need to generally correspond thereto. The different lengths of the centre sections 53 allows the connectors 5 to reach over different distances and thus to be used with different product container diameters. Preferably, the size of the arms 52 adapted to engaging the groove and the space formed by these arms would be kept constant whereas the size of the arms 51 for holding the test product container and the space formed by these arms may be varied and adapted to the size of the test product container.

In the embodiments shown in FIG. 7 the width of the centre sections 53 increases as the length increases. This is in order to give the connectors 5, which are here made from a polymer, such as PEEK, PPS, PTFE or PI, strength and stiffness. It is, however, to be understood that the relative dimensions, including the thickness of the connector, may vary as long as a satisfactory interconnection between the data collector and the test product container is achieved.

Figure 8:
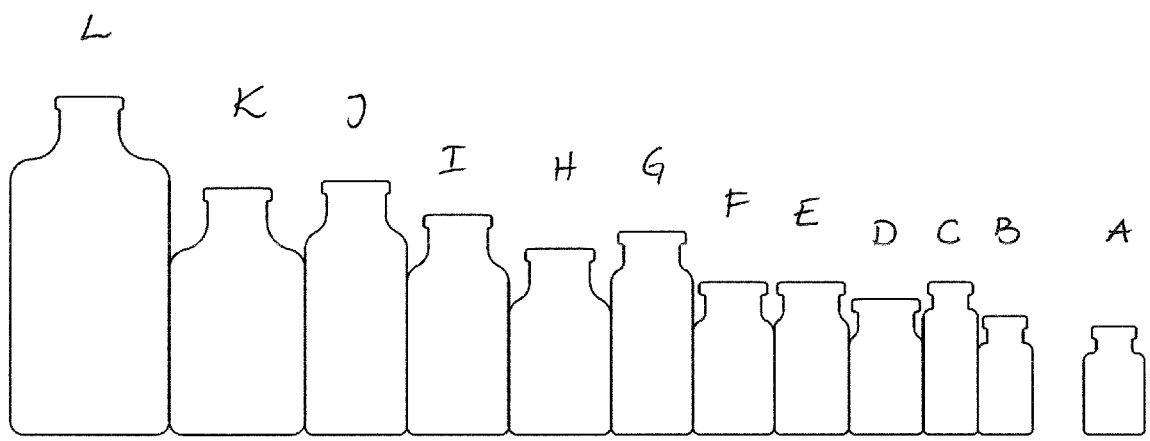
FIG. 8 is a sketch showing the side profile of twelve different vials.
Figure 9:
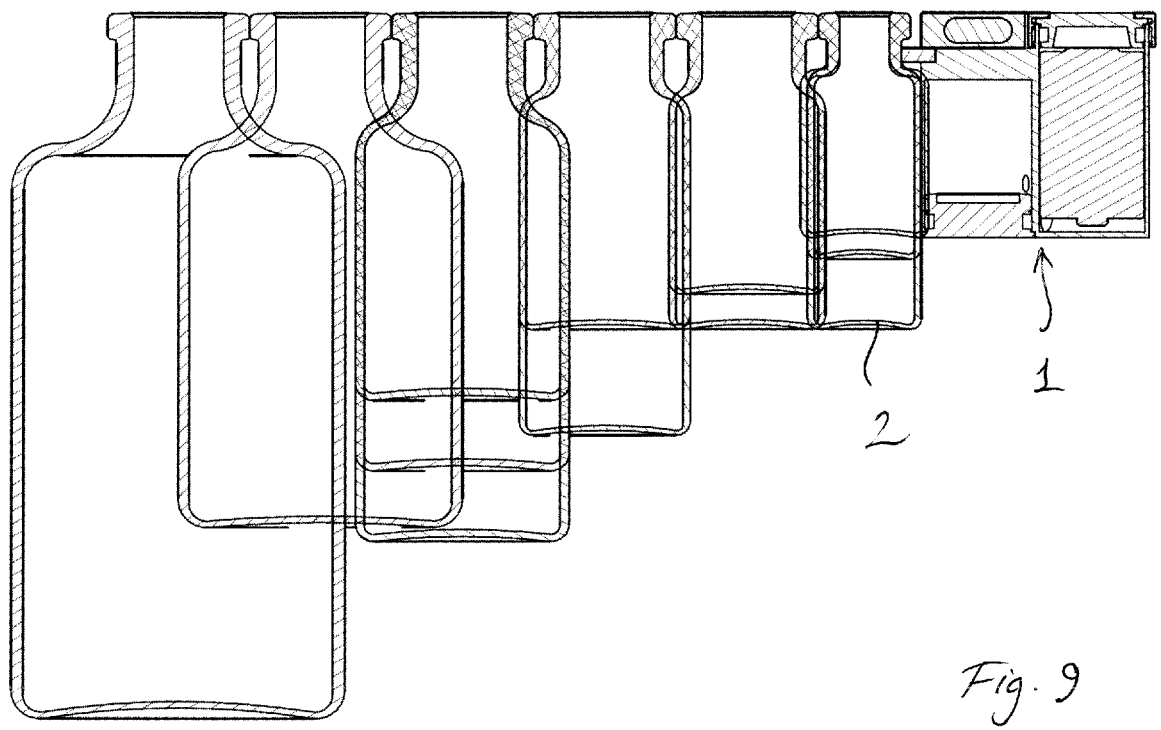
FIG. 9 is a cross-sectional view of the twelve vials in FIG. 8 arranged next to the data collector in FIG. 6.

The variations in diameters and neck sizes in glass vials used for example in the production of pharmaceutical products are illustrated in FIGS. 8 and 10. The vials marked B)-L) in FIG. 8 corresponds to the sizes named 2R, 4R, 6R, 8R 10R, 15R, 20R, 25R, 30R, 50R, and 100R in ISO standard 8362-1, while the vial marked A) is a non-standard but fairly widely used size within pharmaceutical manufacture.

The data collector 1 shown in FIGS. 1-6 is shown with a 2R vial as shown in FIG. 8B. However, the fact that the battery 3 and the electronics unit 4 are arranged side-by-side in separate compartments 111, 112 means that the total height HC of the data collector measured from the first end surface 10 to the second end surface 13 can be kept as low as 30 mm and the diameter of the first and second sections as low as 16 mm allowing it to be used even with the type of vial in FIG. 8A. This means that the height HC of the data collector 1 corresponds substantially to the height of the smallest available product container, and that the largest exterior diameter of first and second portion, respectively, corresponds substantially to the largest diameter of the smallest available product container within ISO standard 8362-1.

The side-by-side compartments may even allow for the use of a thermocouple as the temperature sensor 41 even though this requires more components in the electronics unit than other types of temperature sensors.

The adaptor module 8 used in FIGS. 1-6 compensates for the difference in height between the 2R vial and the vial in FIG. 8A so that the total height HA of the data collector 1 and the adaptor module 8 corresponds to the height of the 2R vial.

In order to facilitate the use of the data collector 1 with many different sizes of product containers 7, it may form part of a system, which comprises several adaptor modules 8 for receiving the data collector as shown in FIGS. 10-16. Each adaptor module 8 has a receiving surface 81 on which the first end surface 10 of the data collector 1 rests and a resting surface 82 configured for resting on the support surface 6 when in use as also seen in FIG. 3. By arranging the data collector 1 on such an adaptor module 8 it is not only possible to increase the height as described above but also to increase the outer dimension so that the dimensions of the assembly consisting of the data collector 1 and the adaptor module 8 corresponds to the dimension of one or two product containers arranged side by side.

In the embodiment in FIG. 10 both the height H and the diameter of the first and second portions of the data collector 1 are increased by the application of the adaptor module 8. As may be seen, the adaptor module is bowl-shaped such that the data collector 1 cannot move sideways in relation to the adaptor module once inserted therein.

In the embodiment in FIG. 11, which is the one also shown in FIGS. 1-5, only the height is increased, and the receiving surface 81 is provided with two projections 83 matching with corresponding openings in the first end surface 10 of the data collector so that mutual sideways movement is prevented. Friction between the projections and the openings may contribute to keeping the data collector 1 in contact with the adaptor module.

FIGS. 12-14 show larger adaptor modules of the same type as shown in FIG. 10 adapted for use with still larger product containers.

In FIGS. 15-16 the diameters of the product containers have become larger than the largest width of the data collector 1 and the adaptor module is therefore made with a circular cross-sectional shape corresponding in diameter to the diameter of the product container.

As may also be seen by comparing FIGS. 10-16, the connectors 5 are different with increasing distances between the arms 51 and increasing lengths of the centre section 53 as the size of the test product vial increases. In FIGS. 10 and 11 the connector in FIG. 7A has been used, in FIGS. 12-14 the connector in FIG. 7B has been used, in FIG. 15 the connector in FIG. 7C has been used, and in FIG. 16 the connector in FIG. 7D has been used.

The data collector 1 according to the invention may be used for monitoring a lyophilisation process of a product in a test product container. For this purpose, the data collector 1 may form part of a system further comprising a data processing unit 9 arranged outside of the lyophilisation chamber 60 as shown in FIG. 17, said data processing unit being configured for being in communication with the data collector 1 when in use in the lyophilisation chamber, here illustrated as a wireless signal 91 from the data collector 1 to the data processing unit 9.

Figure 17:
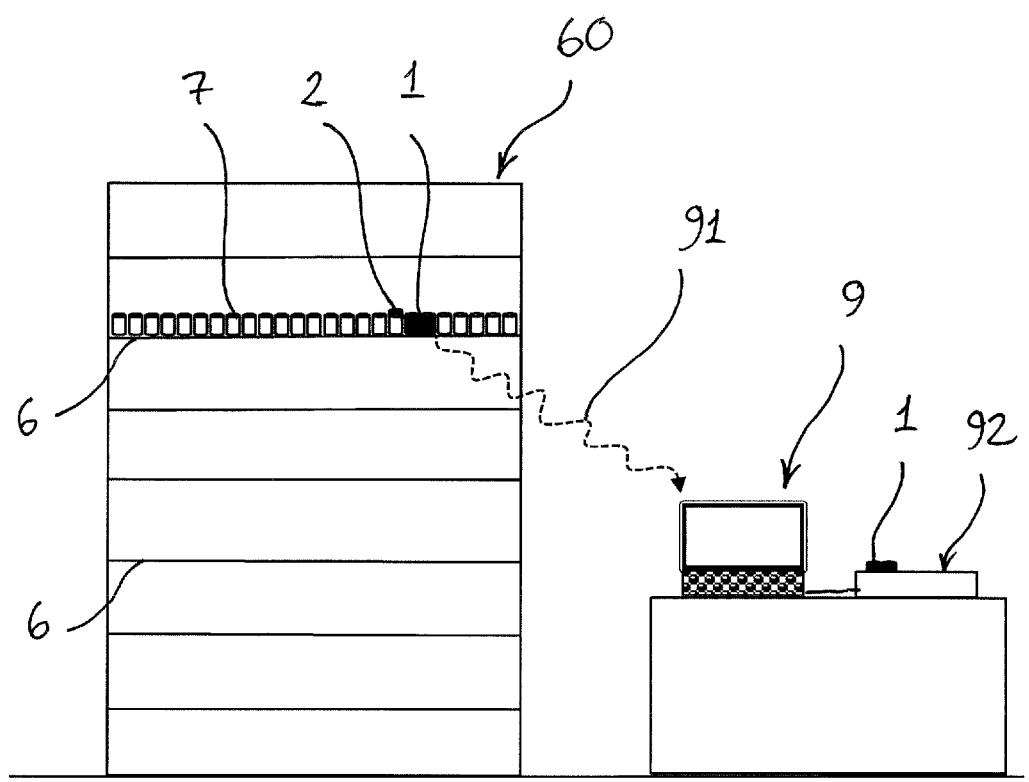
FIG. 17 is a sketch of a lyophilisation chamber and a data processing unit.

In use the data collector 1 is connected to a test product container 2 in the way shown in FIGS. 4-5 and arranged on a support surface 6 of a lyophilisation chamber 60 as illustrated in FIG. 17, forming part of an array of regular test product containers 7 arranged side-by-side. The test product container is of substantially the same size and shape as the regular product containers, preferably identical to them except for being provided with a cap 21, which allows the insertion of a sensor 41, such as a thermocouple, into the product contained therein. If the height HC of the data collector 1 is smaller than the height of the product containers 7 or if the first and/or second section 11, 12 have a diameter, which is smaller than the diameter of the product containers, the data collector 1 may be arranged on an adaptor module as described above.

In this embodiment the lyophilisation chamber includes several superjacent support surfaces 6 as is common practice, but it need not be the case. Here the other support surfaces are shown without product containers, but it is to be understood that they will usually also be filled with product containers.

Once the data collector 1 and the product containers 2, 7 are in place on the support surface 6 the lyophilisation process is initiated, and the data collector starts to collect data from the sensor 41, thereby collecting information about the progress of the lyophilisation process. Data is transmitted to the data processing unit 9 outside the lyophilisation chamber, here illustrated as a wireless signal 91, but is also stored locally in the data collection unit in order to serve as a back-up in case the signal is interrupted.

When the lyophilisation process is complete, the data collector 1 is retrieved and preferably transferred to a docking station 92 where measurement data may be retrieved. The docking station 92 may form part of the data processing unit 9 or be a separate unit, and it may potentially be used for charging and/or storing data collectors, when they are not in use. The docking station 92 may also be referred to as a data reader station.

As the process may take a very long time the data collection need not be continuous as has also been described above.

In this the invention has been described with reference to the use of product containers having a circular cross-sectional shape as this is by far the most common, but it is to be understood that the invention also applies to other product container shapes and that the shape of the data collector as well as any adaptor modules must then be adjusted accordingly.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. It will be understood that certain features and subcombinations are of utility and may be employed without reference to other features and subcombinations and are contemplated within the scope of the claims. The specific configurations and contours set forth in the accompanying drawings are illustrative and not limiting. Some steps may be performed in different orders than described herein.

The invention claimed is:

1. A data collector for use in monitoring a lyophilisation process of a product in a test product container in a lyophilisation chamber, where a plurality of product containers of substantially the same size and shape as one another are arranged side-by-side on a support surface of the lyophilisation chamber, said data collector comprising:
   a first end surface configured for resting on the support surface;
   a second end surface opposite to the first end surface;
   a first compartment in a first portion;
   a second compartment in a second portion;
   a battery; and
   a measuring device including an electronics unit and a sensor configured for being arranged in said test product container;
   wherein:
      said first portion and said second portion are arranged side-by-side when seen in a plane defined by the first end surface; and
      the battery is housed in the first compartment and the electronics unit of the measuring device is housed in the second compartment, such that the battery and the electronics unit are separate from each other.

2. The data collector according to claim 1, wherein the first and second portions each have a cross section parallel to the first end surface, which is substantially circular, such that the corresponding cross section of the data collector is substantially eight shaped.

3. The data collector according to claim 1, wherein the first portion is configured to be distal to the test product container when the data collector is in use, and the second portion is configured to be proximal to the test product container when the data collector is in use.

4. The data collector according to claim 1, wherein the measuring device comprises a temperature measuring device.

5. The data collector according to claim 4, where the temperature measuring device comprises a thermocouple sensor.

6. The data collector according to claim 1, wherein at least one of the first compartment and the second compartment is configured to be opened at the first end surface, the second end surface, or the first end surface and the second end surface.

7. The data collector according to claim 6, wherein the first compartment is provided with a lid comprising a sealing portion.

8. The data collector according to claim 1, wherein a channel extends through an intermediate portion between the first and the second compartment.

9. The data collector according to claim 1, further comprising a connector for holding a test product container when the data collector is in use, said connector preferably being attached at the second portion.

10. The data collector according to claim 1, wherein the second portion comprises at least one connection terminal for connecting the sensor to the electronics unit.

11. The data collector according to claim 1, wherein the electronics unit comprises at least one element selected from the group consisting of: a wireless transmitter/receiver unit (WTRU), a data storage unit, a hall sensor, and a control unit.

12. The data collector according to claim 1, wherein a distance between first and second end surface is less or equal to 30 mm.

13. The data collector according to claim 12, having a height measured from the first end surface to the second end surface, which corresponds substantially to a height of a smallest available product container, and where the largest exterior diameter of first and second portion, respectively, corresponds substantially to the largest diameter of the smallest available product container.

14. The data collector according to claim 1, wherein the product containers are vials, in the range 2 R to 100 R.

15. The data collector according to claim 1, further comprising an adapter module for receiving the data collector such that the first end surface rests on a receiving surface of the adaptor module, said adaptor module having a resting surface configured for resting on the support surface.

16. A system comprising at least one data collector according to claim 1, wherein the system further comprises a data processing unit arranged outside of the lyophilisation chamber, said data processing unit being in communication with the data collector when in use in the lyophilisation chamber.

17. The system of claim 16, further comprising at least one adapter module for receiving the data collector such that the first end surface rests on a receiving surface of the adaptor module, said adaptor module having a resting surface configured for resting on the support surface.

18. A system comprising at least one data collector according to claim 1, wherein the system further comprises at least one adaptor module for receiving the data collector, such that the first end surface rests on a receiving surface of the adaptor module, said adaptor module having a resting surface configured for resting on the support surface.

19. The system of claim 18, wherein the product containers are vials, preferably in the range 2 R to 100 R.

20. The system of claim 18, wherein an area of the support surface occupied by the data collector corresponds substantially to an area occupied by two product containers arranged side-by-side.

* * * * *